United States Patent
Ryu et al.

(10) Patent No.: US 11,503,492 B2
(45) Date of Patent: Nov. 15, 2022

(54) CONGESTION CONTROL FOR SIDELINK TRANSMISSIONS

(71) Applicant: QUALCOMM Incorporated, San Diego, CA (US)

(72) Inventors: Jung Ho Ryu, Fort Lee, NJ (US); Kapil Gulati, Hillsborough, NJ (US); Junyi Li, Chester, NJ (US); Tianyang Bai, Somerville, NJ (US); Sony Akkarakaran, Poway, CA (US); Tao Luo, San Diego, CA (US); Vasanthan Raghavan, West Windsor Township, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/943,482

(22) Filed: Jul. 30, 2020

(65) Prior Publication Data

US 2021/0037414 A1    Feb. 4, 2021

Related U.S. Application Data

(60) Provisional application No. 62/882,447, filed on Aug. 2, 2019.

(51) Int. Cl.
*H04W 28/02* (2009.01)
*H04W 72/04* (2009.01)
(Continued)

(52) U.S. Cl.
CPC ........... *H04W 28/02* (2013.01); *H04L 47/215* (2013.01); *H04W 28/0236* (2013.01);
(Continued)

(58) Field of Classification Search
CPC ....... H04L 47/39; H04L 47/24; H04L 1/0001; H04L 1/06; H04L 1/0034; H04L 47/215;
(Continued)

(56) References Cited

U.S. PATENT DOCUMENTS 10,993,247 B2* 4/2021 Seo .................. H04W 76/14
2008/0146241 A1* 6/2008 Das .................. H04L 5/023
                                                        455/450
(Continued)

FOREIGN PATENT DOCUMENTS

EP        3504897 A1      7/2019
KR    WO 2018/062832   *  9/2017 ............ H04W 28/02
(Continued)

OTHER PUBLICATIONS

International Search Report and Written Opinion—PCT/US2020/044537—ISA/EPO—dated Oct. 7, 2020.

*Primary Examiner* — Kevin C. Harper
(74) *Attorney, Agent, or Firm* — Procopio, Cory, Hargreaves & Savitch LLP

(57) ABSTRACT

An apparatus for wireless communication based on sidelink accumulates a value, e.g., a token value, based on an accumulation rate of a transmit beam. When the apparatus has a packet for transmission over sidelink, the apparatus determines whether to transmit the packet over the sidelink based on a current accumulation of the value. The accumulation may be based on any of a CBR, a CR, and/or a feedback rate. A base station may measure interference on an access link of the base station and transmit a side link parameter that controls accumulation of a value at a transmitting device for the transmission of sidelink communication based on the measured interference.

30 Claims, 11 Drawing Sheets

(51) Int. Cl.
*H04W 72/08* (2009.01)
*H04L 47/215* (2022.01)
*H04W 24/08* (2009.01)
*H04W 72/10* (2009.01)

(52) U.S. Cl.
CPC ....... *H04W 72/042* (2013.01); *H04W 72/082* (2013.01); *H04W 24/08* (2013.01); *H04W 28/0289* (2013.01); *H04W 72/10* (2013.01)

(58) Field of Classification Search
CPC ......... H04W 72/1242; H04W 28/0289; H04W 24/08; H04W 72/10; H04W 28/02; H04W 28/0236; H04W 72/042; H04W 72/082; H04B 7/063; H04B 7/0617
See application file for complete search history.

(56) References Cited

U.S. PATENT DOCUMENTS

| | | | | |
|---|---|---|---|---|
| 2015/0071074 A1* | 3/2015 | Zaidi | ................ | H04L 47/24 |
| | | | | 370/235.1 |
| 2019/0116122 A1* | 4/2019 | Friedman | ................ | H04L 47/12 |
| 2019/0124015 A1* | 4/2019 | Loehr | ................ | H04W 76/14 |
| 2019/0372653 A1* | 12/2019 | Chae | ................ | H04B 7/14 |
| 2021/0099847 A1* | 4/2021 | Uchiyama | ................ | H04W 4/40 |
| 2021/0153065 A1* | 5/2021 | Adjakple | ................ | H04W 4/40 |
| 2021/0282143 A1* | 9/2021 | Lee | ................ | H04W 52/281 |

FOREIGN PATENT DOCUMENTS

| | | |
|---|---|---|
| WO | 2018062832 A1 | 4/2018 |
| WO | 2019045464 A1 | 3/2019 |

\* cited by examiner

CONGESTION CONTROL FOR SIDELINK TRANSMISSIONS

CROSS REFERENCE TO RELATED APPLICATION(S)

This application claims the benefit of U.S. Provisional Application Ser. No. 62/882,447, entitled "Congestion Control for Transmissions on Sidelink" and filed on Aug. 2, 2019, which is expressly incorporated by reference herein in its entirety.

BACKGROUND

Technical Field

The present disclosure relates generally to communication systems, and more particularly, to wireless communication directly between devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices over sidelink, such as in V2X or other D2D communication. The communication may be based on sidelink rather than an access link between a user equipment (UE) and a base station. There exists a need for further improvements in wireless technology including sidelink communication. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

At times, multiple devices may have communication to transmit on sidelink. While packet priority may be used to determine whether to transmit a particular packet, multiple devices may have high priority packets to transmit. Each of the devices having a high priority packet may attempt to transmit at an overlapping time. The overlapping transmissions may interfere with each other and may reduce accurate reception of the communication. A sidelink device may determine to transmit such higher priority packets with reduced delay. For example, the device may determine to transmit the higher priority message without waiting, even if the message will cause interference to other wireless device and/or even if reception of the higher priority packet is not guaranteed. A sidelink device may wait to transmit lower priority messages. For example, the device may wait until a channel is clear, and may yield to higher priority messages.

Aspects presented herein enable sidelink devices to avoid interference with one another by helping to spread sidelink transmissions in time and enabling the transmission of high priority messages while also providing opportunities for the transmission of lower priority messages. Aspects include a UE tracking an accumulated value that is increased in a periodic manner according to an accumulation rate and determining whether to transmit a message based on the accumulated value for a beam that the UE intends to use for the communication.

In an aspect of the disclosure, a method, a computer-readable medium, and an apparatus are provided for wireless communication at a sidelink device. The apparatus accumulates a value based on an accumulation rate of a transmit beam. The apparatus identifies a packet for transmission over a sidelink and determines whether to transmit the packet over the sidelink based on a current accumulation of the value.

In an aspect of the disclosure, a method, a computer-readable medium, and an apparatus are provided for wireless communication at a base station. The apparatus measures interference on a link of the base station and transmits a sidelink parameter based on the measured interference. The sidelink parameter controls accumulation of a value of a transmit beam at a transmitting device for the transmission of sidelink communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
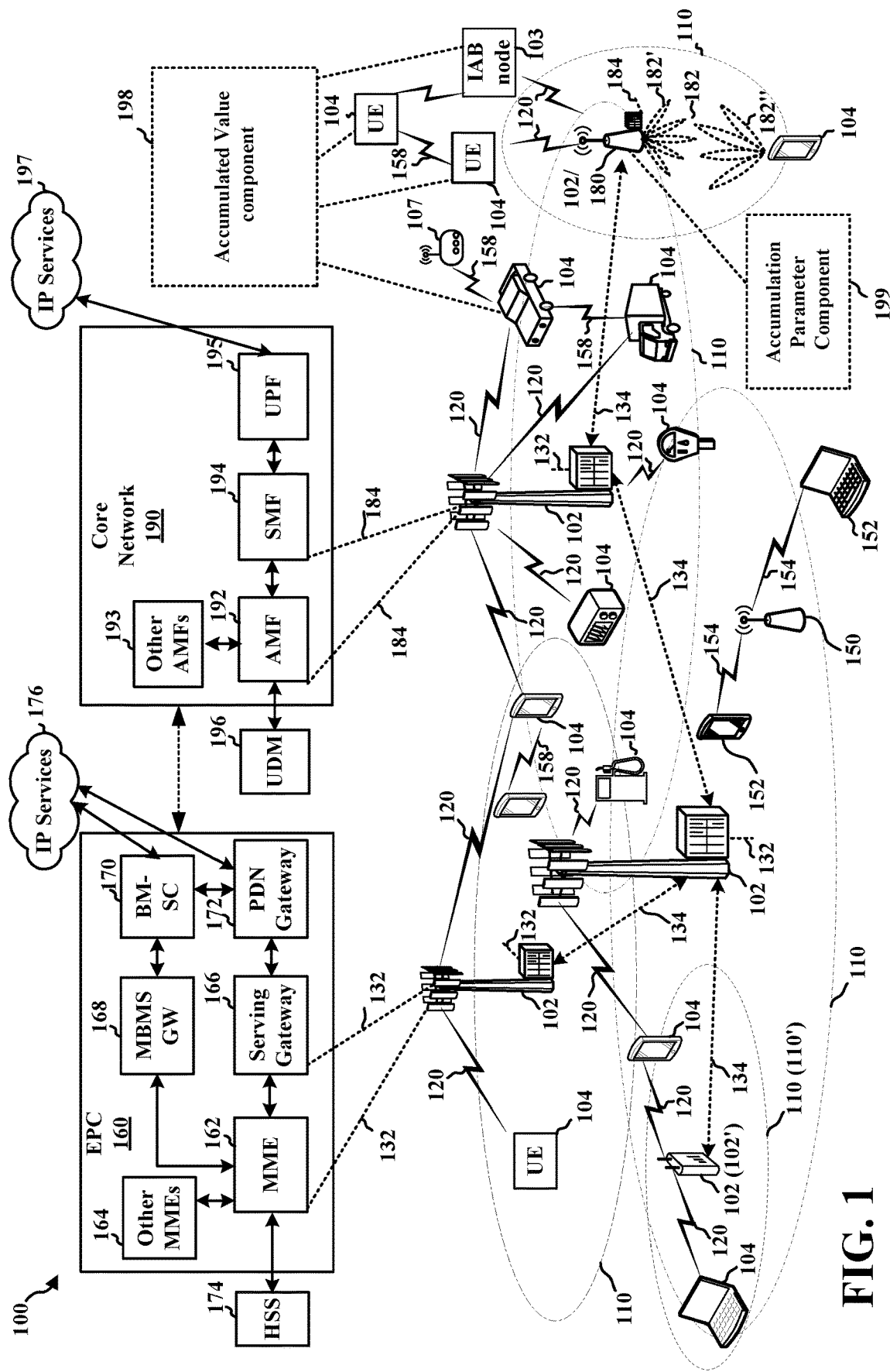
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells may include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using a link 158 directly between devices, which may be referred to as a device-to-device (D2D) communication link. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X or other D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication may be exchanged via sidelink rather than an access link between a base station and a UE. The sidelink communication may be transmitted or received by a UE, an integrated access and backhaul (IAB) node, or other sidelink device.

The communication may be based on vehicle-to-anything (V2X) or other D2D communication, such as Proximity Services (ProSe), etc. One example of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (CV2X), and/or a combination thereof and/or with other devices, which can be collectively referred to as V2X communication. Referring again to FIG. 1, in certain aspects, a UE 104, e.g., a UE, may be configured to transmit messages directly to another UE 104. V2X or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, sidelink devices, e.g., UE 104, RSU 107, IAB node 103, etc. communicating based on sidelink, may comprise an accumulated value component 198 that is configured to maintain an accumulated value based on an accumulation rate and to use the accumulated value to determine whether to transmit packet(s) over the sidelink. A base station 102/180 may comprise an accumulation parameter component 199 configured to transmit a sidelink parameter that may be used by the sidelink devices (e.g., UE 104, IAB node 103, RSU 107, etc.) to control accumulation of the value and to control amounts of sidelink communication.

Figure 2:
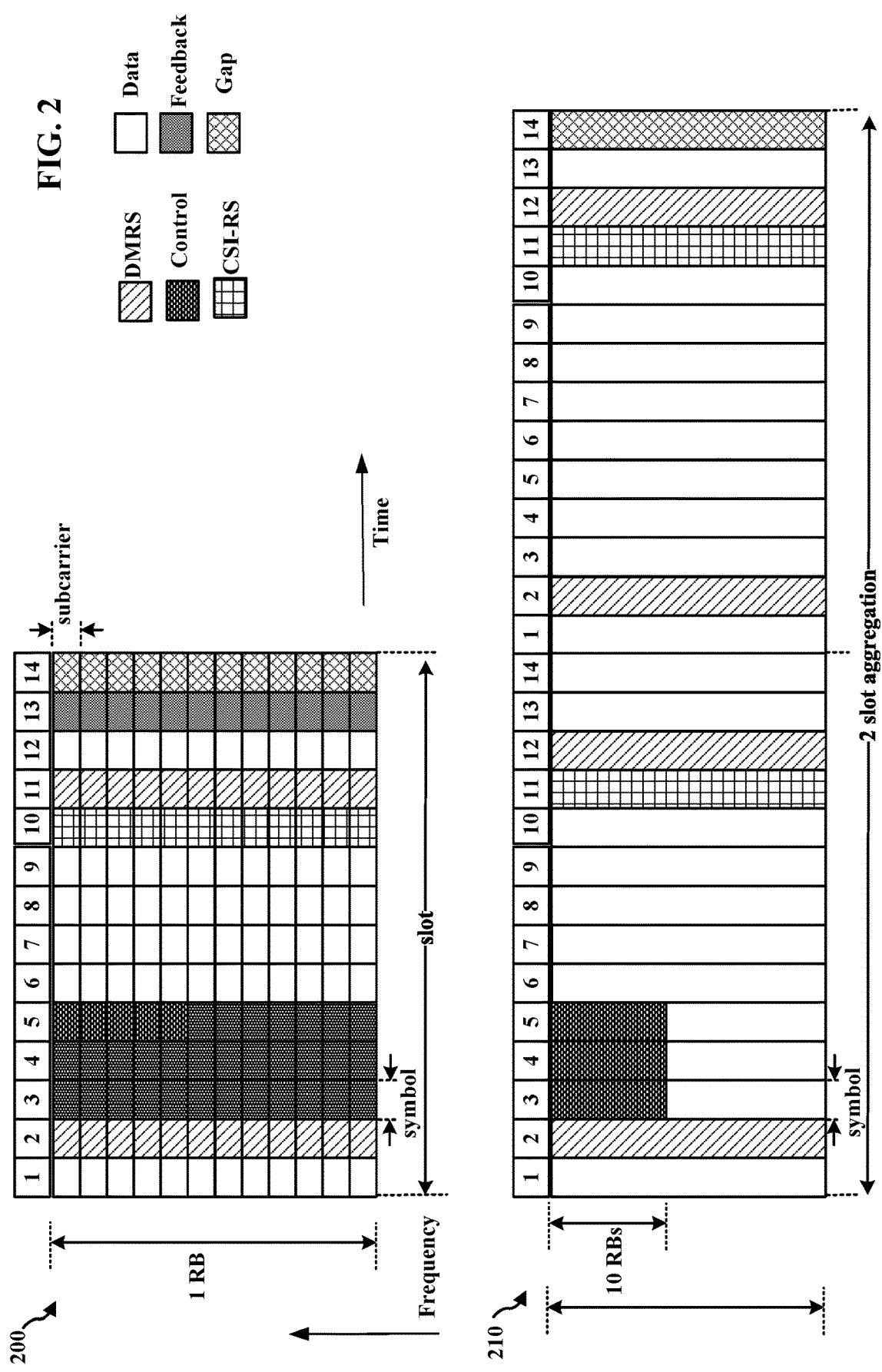
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
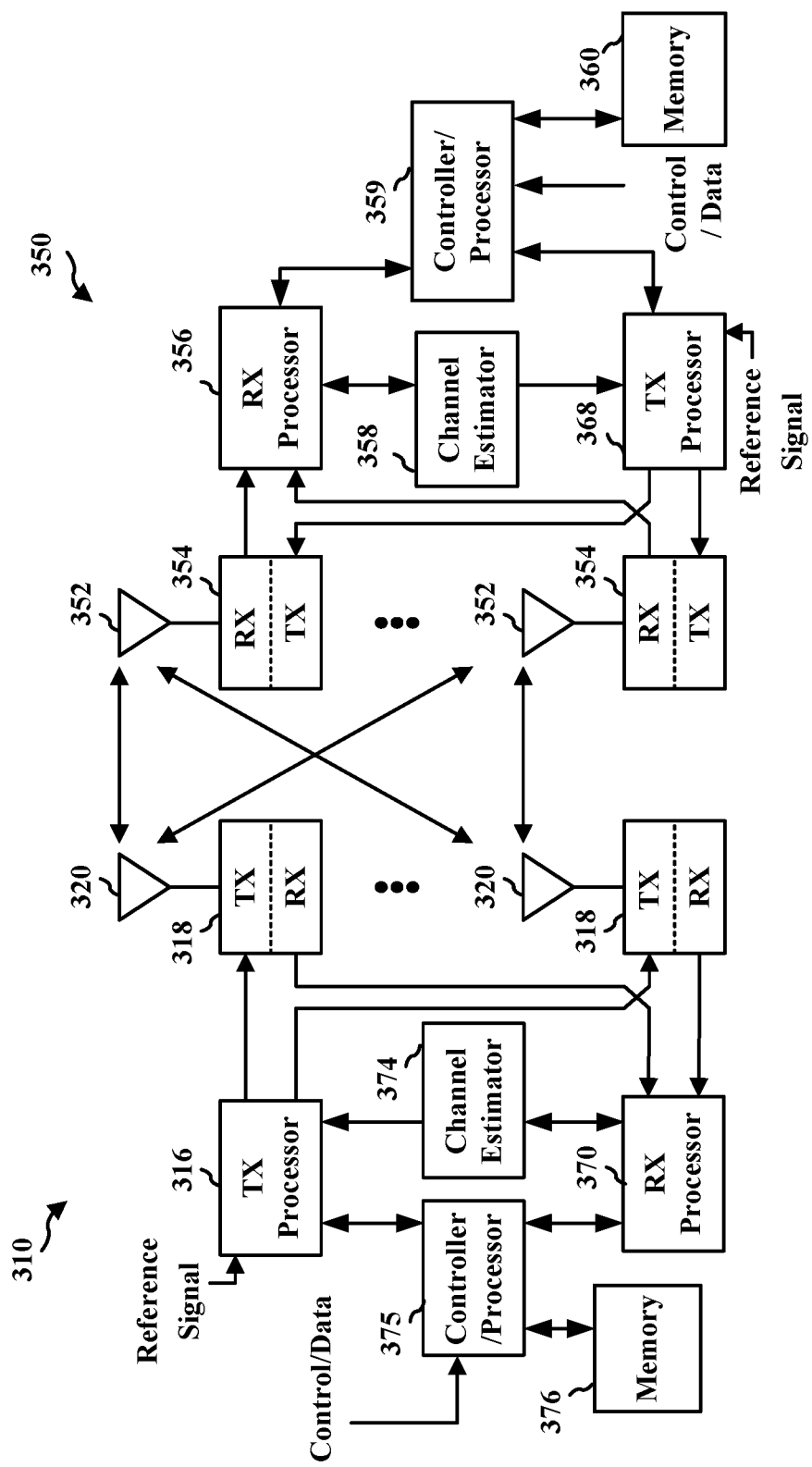
FIG. 3 is a diagram illustrating an example of a first device and a second device involved in wireless communication based, e.g., on sidelink.

FIG. 3 is a block diagram of a first wireless communication device 310 in communication with a second wireless communication device 350. The communication may be based on sidelink. For example, the communication may be based on any of V2X or other D2D communication. The device 310 may comprise a UE, and IAB node, an RSU, etc.

Device 350 may comprise a UE, an RSU, and IAB node, etc. In some examples, device 310 may correspond to a base station in communication with a UE, e.g., device 350, e.g., based on an access link. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 of device 310 may be configured to perform aspects described in connection with 198 of FIG. 1.

In another example, at least one of the TX 316, the RX processor 370, or the controller/processor 375 of device 310 may be configured to perform aspects described in connection with 199 of FIG. 1.

An access link may be a communication link between a UE and a base station, e.g., link 120 between a UE 104 and a base station 102/180. A sidelink may be a communication link between a device and another device, e.g., between two UEs 104, between IAB nodes, between an IAB node and a UE, etc. For example, communication link(s) 158 may correspond to a sidelink.

At times, multiple devices may have communication to transmit on sidelink. While packet priority may be used to determine whether to transmit a particular packet, multiple devices may have high priority packets to transmit. Each of the devices having a high priority packet may attempt to transmit at an overlapping time. The overlapping transmissions may interfere with each other and may reduce accurate reception of the communication. Examples of higher priority packets may include, e.g., public safety messages in a V2X network, a collision warning in a V2X network, etc. A sidelink device may determine to transmit such higher priority packets with reduced delay. For example, the device may determine to transmit the higher priority message without waiting, even if the message will cause interference to other wireless device and/or even if reception of the higher priority packet is not guaranteed. Lower priority messages may include, e.g., gaming packets in a network controlled interactive service, traffic flow management in V2X network, etc. A sidelink device may wait to transmit such lower priority messages. For example, the device may wait until a channel is clear, may yield to higher priority messages, etc. The sidelink device may prioritize messages based on a channel busy rate (CBR) and/or channel occupancy rate (CR). A CBR may indicate a percentage of resources, e.g., in time, that were active (e.g., used for communication). For example, a CBR may indicate how many of the last one hundred slots were used for communication by UE(s). A CR may indicate a percentage of the resources that were used by a particular UE. For example, a UE may determine how many slots were used by the UE to transmit communication. The CBR may be indicated as a percentage or a ratio of available channel resources over an amount of time that were used for transmissions (e.g., A/B, where A is the amount of channel resources that were used for transmissions over the amount of time and B is the amount of available resources over the amount of time). For example, on a scale of 0% to 100%, 0% may mean that the channel was completely unoccupied during the period of time and 100% may mean that the channel was completely occupied by one or more transmissions during the period of time. As one example of using CBR or CR in order to determine when to transmit, a UE may determine whether a CR for the UE is greater than a maximum CR for a particular measured CBR, e.g., whether $CR > CR_{limit}$ for the CBR. If the CR exceeds the maximum for the CBR, the UE may determine not to transmit. Otherwise, the UE may go forward with the transmission. However, such a use of the CR does not include prioritization of higher priority messages.

Aspects presented herein enable sidelink devices to avoid interference with one another by helping to spread sidelink transmissions in time and enabling the transmission of high priority messages. A UE may track an accumulated value that is increased in a periodic manner according to an accumulation rate. For example, the accumulated value may increase by 1 every 10 slots. The value that is accumulated may be referred to as a token, a count, etc. The term "token" may be used herein to refer to the value/count that increases according to the accumulation rate. As token refers to a count, a value, a number, etc. that is accumulated, the term virtual token may also be used to refer to the value that is accumulated.

Figure 4:
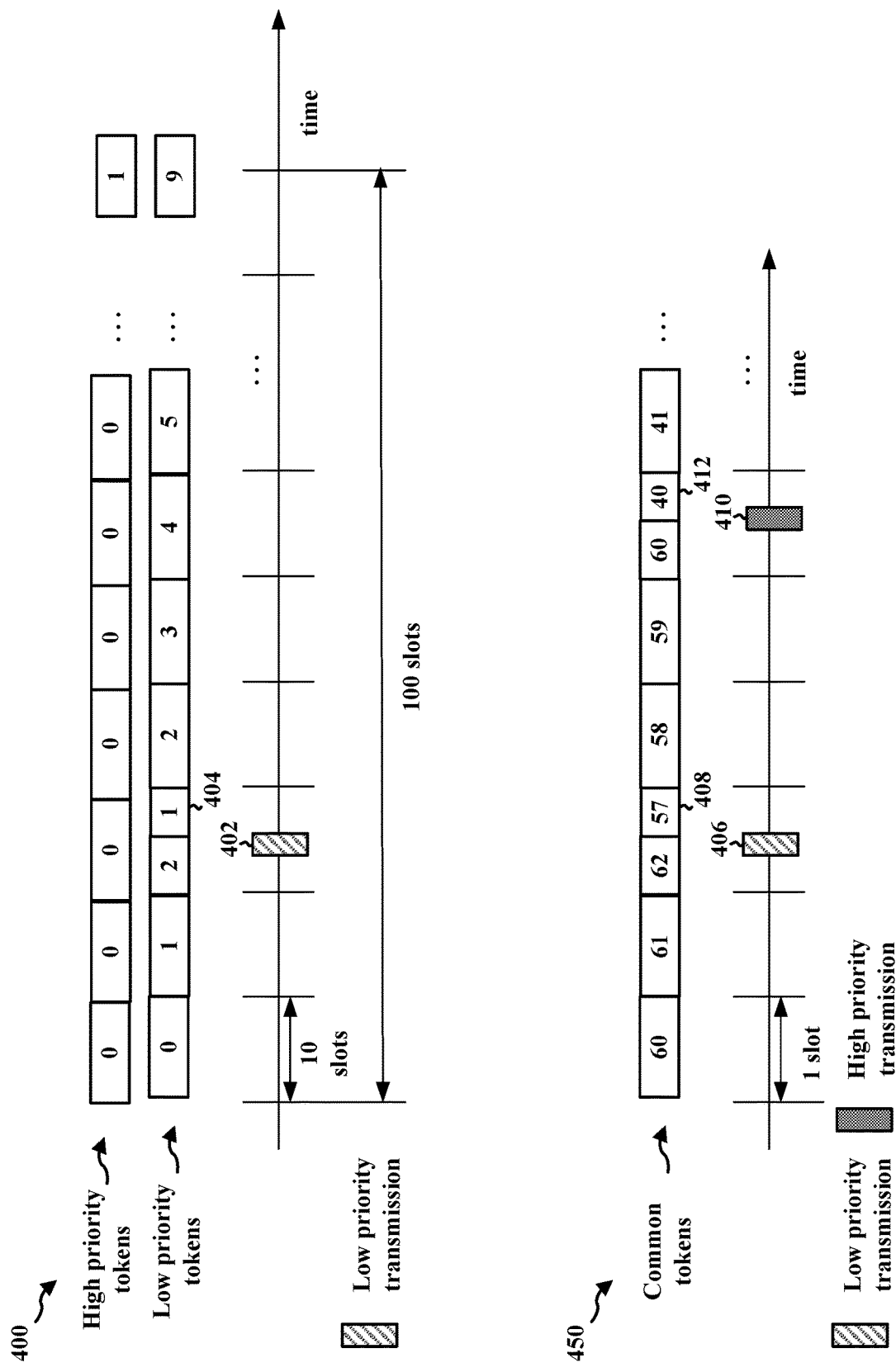
FIG. 4 illustrates examples of accumulation of token values for sidelink communication.

For example, different counts/values may be accumulated for different priority levels that are possible for sidelink communication. Tokens of a first priority level may accumulate at a first rate, and tokens of a second priority level may accumulate at a second rate. Although two levels of priority and two accumulation rates are described, this is merely an example to illustrate the concept of different accumulation rates for different priority levels. There may be three, four, or more different priority levels, each having an accumulation rate. As one example, tokens for high priority communication may accumulate at a rate of 1 token per 100 slots, whereas tokens for lower priority communication may accumulate at a rate of 1 token per 10 slots. Thus, the high priority tokens may accumulate at a slower rate than the lower priority tokens. The example of 1 token and the rates of every 100 slots and every 10 slots are merely illustrative of the concept. The accumulation rates may differ from these examples. FIG. 4 illustrates an example 400 showing the accumulation of token values at different rates for different priority levels. In the example, high priority message tokens increase at an accumulation rate of 1 token per 100 slots. Thus, an initial token value of 0 is increased to 1 following 100 slots. The lower priority message token value is accumulated at a rate of 1 token per 10 slots. Thus, the number of accumulated tokens increases from 0 to 1 after 10 slots, then increases from 1 to 2 after a second set of 10 slots and so forth.

When a device has communication to transmit, e.g., via sidelink, the device may determine whether the current number of accumulated tokens meets a transmission threshold. For example, there may be a cost in tokens associated with transmission. As an example, the transmission threshold may be associated with a cost of a single token. Thus, if the device has one accumulated token for high priority transmissions, the device may transmit a high priority message. If the device does not have a high priority message token accumulated, the device may determine not to transmit the message and/or may delay the message until the device has accumulated a token for high priority messages. If the device does go forward with the transmission, the device deducts a value of tokens from the accumulated amount based on the cost Using the example cost of a single token, if the current accumulated tokens at a device is 2 tokens, when the device transmits a high priority message, the device would deduct a token so that the accumulated amount is 1 token. The device may similarly determine whether the accumulated value of tokens meet the threshold to transmit a low priority message. If so, the device may proceed to transmit the low priority message and may deduct an amount of tokens corresponding to the cost. If not, the device may wait to transmit and/or may decide not to transmit. The cost or token value associated with a high priority message may be the same as the cost or token value associated with a lower priority message. For example, both may require a single token to be present in the corresponding accumulated token values. In another example, the token cost may be different for different types/priorities of messages.

In the example 400 of FIG. 4, a low priority transmission 402 is transmitted. At the time that the device has the low priority message for transmission, the accumulated value for low priority messages is 2 tokens. If the low priority transmission is associated with 1 token, the device has enough accumulated tokens and may transmit the low priority message. The device also reduces the accumulated token value from 2 to 1, as shown at 404. At the end of the 10 slots, the accumulated value increases from 1 to 2, and continues to increase by 1 every 10 slots. The device similarly deducts from the accumulated value of high priority tokens, if a high priority transmission is transmitted.

There may be a maximum value for accumulated tokens. For example, a device may accumulate tokens up to a maximum value of 10. After accumulating 10 tokens, the device may stop increasing the accumulated value of tokens until the accumulated value drops below 10. A maximum value of 10 is used merely to illustrate the concept. Any maximum value may be established. The maximum value may be the same for different priority levels of messages. In another example, there may be a different maximum value for different priority level messages. As an example, the device may accumulate tokens for high priority messages up to a maximum value of 1 token. Thus, after accumulating a single token, the device may stop increasing the accumulated token value for high priority messages until after a high priority message has been transmitted. For lower priority messages, the device may accumulate tokens up to a maximum value of 10 tokens, for example.

In other aspects, a common value may be used to accumulate tokens for messages of different priority levels. As an example, a common, or generic, token value may be increased at an accumulation rate of 1 token per slot. Any accumulation rate may be used, the example of 1 token per slot is merely an example to illustrate the concept. FIG. 4 illustrates an example 450 showing the accumulation of a common token value that increases at a rate of 1 token per slot. Thus, following a first slot, the accumulated token value may increase from an initial value of 60 to 61. Following the next slot, the accumulated token value may increase from 61 to 62, and so forth. In order to transmit, a device may determine whether the accumulated value meets a threshold amount, e.g., a value associated with transmitting the message. While the value may be the same for low priority messages and high priority messages, the use of different threshold values for different priority levels may also be used. For example, a threshold of 20 tokens may be used for high priority transmissions, and a threshold of 5 tokens may be used for low priority transmissions. When the device has a low priority message for transmission, e.g., transmission 406, the accumulated value of 62 tokens is more than the 5 token threshold. Thus, the device transmits the low priority transmission 406 and reduces the accumulated token value from 62 to 57, at 408, by reducing the 5 token value for low priority transmissions. The accumulated value continues to increase per slot. When the device has a high priority message for transmission, e.g., transmission 410, the accumulated value of 60 tokens is more than the 20 token threshold. Thus, the device transmits the high priority transmission 410 and reduces the accumulated token value from 60 to 40, at 412, by reducing the 20 token value for high priority transmissions. The accumulated value continues to increase per slot. The common token value may be accumulated to a maximum amount. As one example, the device may increase the accumulated token value to a maximum amount of 100 tokens. Any maximum value may be applied, 100 is merely an example to illustrate the concept.

For either example 400 or 450, token arrival, the accumulation rate, the maximum number of tokens, the cost of transmission, etc., may be based on a CBR, a CR, a feedback (e.g., ACK/NACK) rate, and/or a beam used for communication. As an example, if an ACK rate increases above a threshold level, a token arrival rate may be increased so that tokens are accumulated over a shorter duration of time. As another example, if an ACK rate is above a threshold level, an accumulation rate may be increased. As another example, if an ACK rate is above a threshold level, the token cost for transmission may be decreased. The opposite actions may be performed if the ACK rate is below the threshold level or is a NACK rate is above a threshold NACK level. As an example, the ACK rate may be based on a number of ACKs, a number of ACKs within a period of time, a percentage of ACKs, etc.

Figure 5:
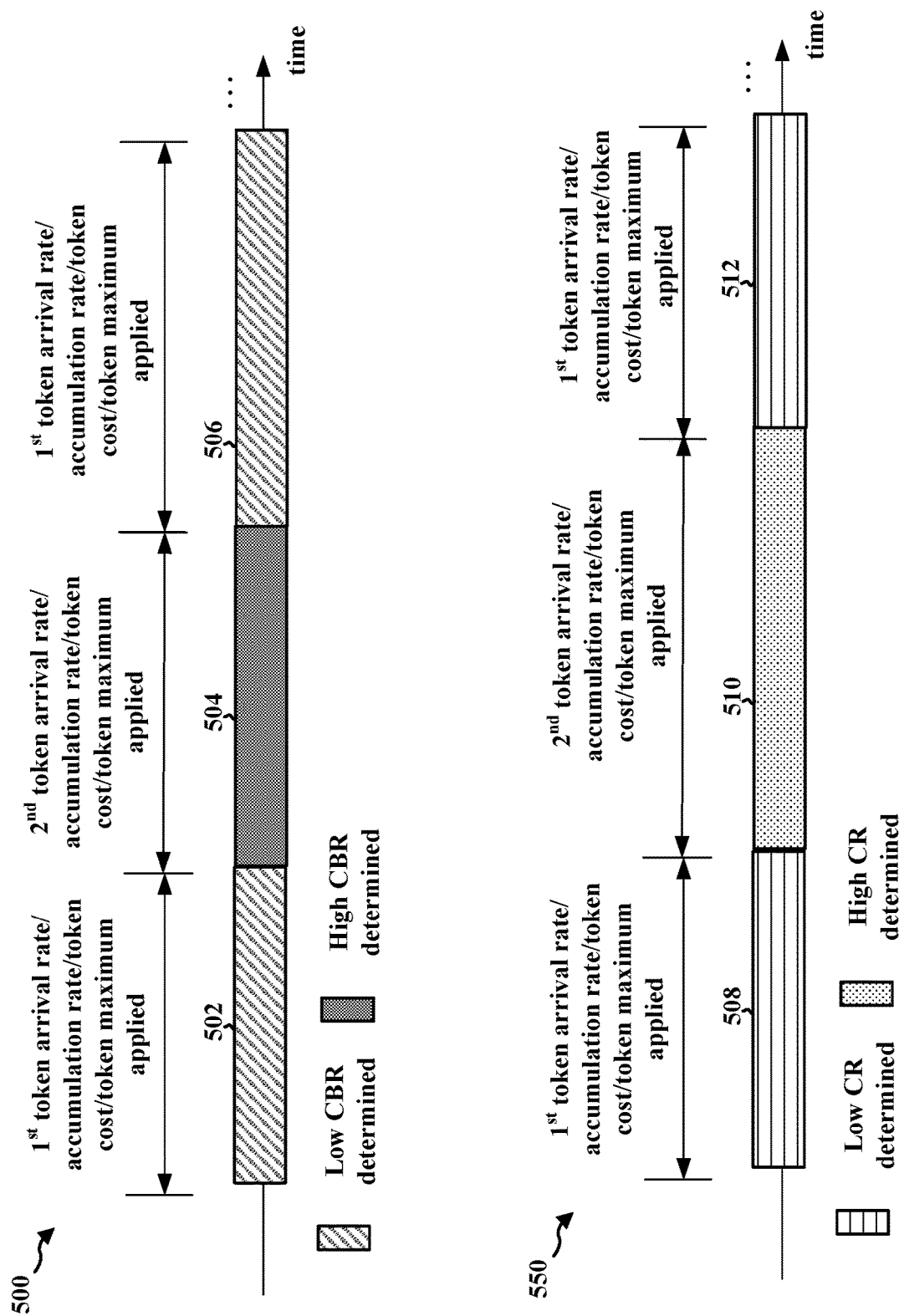
FIG. 5 illustrates examples of accumulation of token values for sidelink communication.

For example, if CBR is high, e.g., the CBR increases above a threshold level, a token arrival rate may be reduced so that tokens are accumulated over a longer duration of time, e.g., every 2 slots or every 5 slots rather than every slot. As another example, if the CBR is above a threshold level, an accumulation rate may be reduced. For example, rather than using an accumulation rate of 5 tokens every 10 slots, the device may reduce the accumulation rate to 1 token every 10 slots. As another example, if the CBR is above a threshold level, the token cost for transmission may be increased. For example, the threshold amount of tokens required to transmit and/or the amount of tokens deducted from the accumulated value for transmission may increase. As another example, the maximum number of tokens may decrease when the CBR is above a threshold level. Thus, rather than accumulating the token value up to a maximum of 10 tokens, the UE may accumulate the token value up to a maximum of 5 tokens. Any combination of the token arrival rate/accumulation rate, transmission cost, transmission threshold, maximum number of accumulated tokens, as well as additional parameters, may be adjusted based on a determined CBR. FIG. 5 illustrate s an example 500 showing a change from a first token arrival rate/accumulation rate, transmission cost, transmission threshold, and/or maximum number of accumulated tokens being applied by a device when a first CBR is determined during period 502. A second token arrival rate/accumulation rate, transmission cost, transmission threshold, and/or maximum number of accumulated tokens is applied by the device when a second CBR is determined at period 504. For example, the second CBR may correspond to a CBR above a threshold amount, and the adjustment may correspond to a decreased token arrival rate/accumulation rate, an increased transmission cost, an increased transmission threshold, an/or a decreased maximum for the accumulated tokens. The higher CBR indicates that a threshold amount of resources is being actively used, and the adjustment(s) may reduce the likelihood that the device will be able to transmit a transmission. The device may return to using the first token arrival rate/accumulation rate, transmission cost, transmission threshold, and/or maximum number of accumulated tokens during period 506, e.g., if the CBR returns to a level below the threshold amount.

For example, if the CR is high, e.g., if the CR increases above a threshold level, a token arrival rate may be reduced so that tokens are accumulated for a longer duration of time, as described in connection with the example for the CBR. As another example, if the CR is above a threshold level, an accumulation rate may be reduced, as described in connection with the example for the CBR. As another example, if the CR is above a threshold level, the token cost for transmission may be increased, as described in connection with the example for the CBR. As another example, the maximum number of tokens may decrease when the CR is above a threshold level, as described in connection with the example for the CBR. Any combination of the token arrival rate/accumulation rate, transmission cost, transmission threshold, maximum number of accumulated tokens, as well as additional parameters, may be adjusted based on a determined CR. FIG. 5 illustrates an example 550 showing a change from a first token arrival rate/accumulation rate, transmission cost, transmission threshold, and/or maximum number of accumulated tokens being applied by a device when a first CR is determined during a period 508. A second token arrival rate/accumulation rate, transmission cost, transmission threshold, and/or maximum number of accumulated tokens is applied by the device when a second CR is determined at a period 510. For example, the second CR may correspond to a CR above a threshold amount, and the adjustment may correspond to a decreased token arrival rate/accumulation rate, an increased transmission cost, an increased transmission threshold, an/or a decreased maximum for the accumulated tokens. The higher CR indicates that the device has used a threshold amount of resources, and the adjustment(s) may reduce the likelihood that the device will be able to transmit a transmission. The device may return to using the first token arrival rate/accumulation rate, transmission cost, transmission threshold, and/or maximum number of accumulated tokens during period 512, e.g., if the CR returns to a level below the threshold amount.

Figure 6:
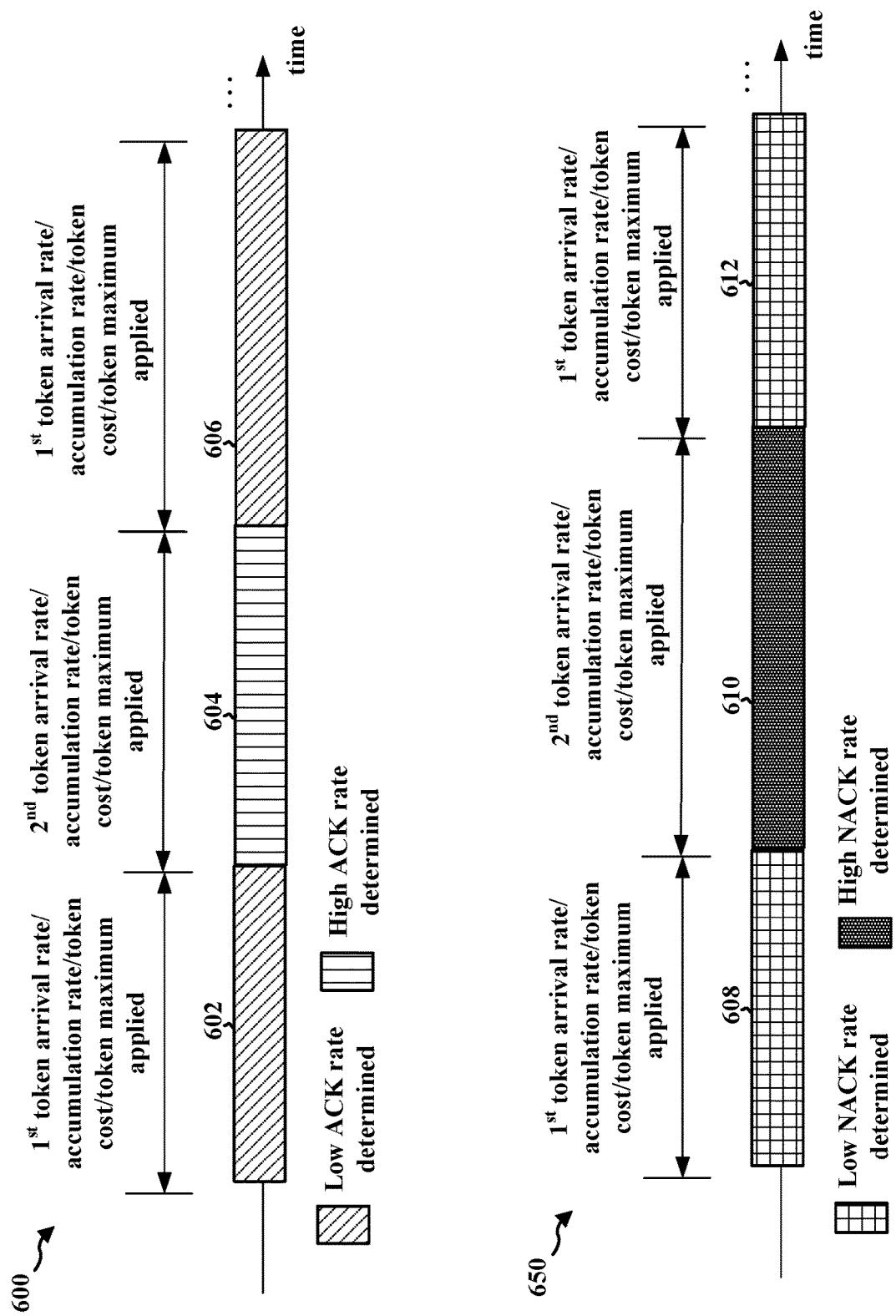
FIG. 6 illustrates examples of accumulation of token values for sidelink communication.

For example, if an ACK rate is high, e.g., if an ACK rate increases above a threshold level, a token arrival rate may be increased so that tokens are accumulated over a shorter duration of time. As another example, if an ACK rate is above a threshold level, an accumulation rate may be increased. As another example, if an ACK rate is above a threshold level, the token cost for transmission may be decreased. As another example, the maximum number of tokens may increase when an ACK rate is above a threshold level. Any combination of the token arrival rate/accumulation rate, transmission cost, transmission threshold, maximum number of accumulated tokens, as well as additional parameters, may be adjusted based on a determined an ACK rate. FIG. 6 illustrates an example 600 showing a change from a first token arrival rate/accumulation rate, transmission cost, transmission threshold, and/or maximum number of accumulated tokens being applied by a device when a first ACK rate is determined during the period 602. A second token arrival rate/accumulation rate, transmission cost, transmission threshold, and/or maximum number of accumulated tokens is applied by the device when a second ACK rate is determined at the period 604. For example, the second ACK rate may correspond to an ACK rate above a threshold amount and the adjustment may correspond to an increased token arrival rate/accumulation rate, a reduced transmission cost, a reduced transmission threshold, an/or an increased maximum for the accumulated tokens. The adjustments may increase the likelihood that the device will be able to transmit a transmission. The device may return to using the first token arrival rate/accumulation rate, transmission cost, transmission threshold, and/or maximum number of accumulated tokens during period 606, e.g., if the ACK rate returns to a level below the threshold amount.

For example, if a NACK rate is high, e.g., if a NACK rate increases above a threshold level, a token arrival rate may be decreased so that tokens are accumulated over a longer duration of time. As another example, if the NACK rate is above a threshold level, an accumulation rate may be decreased. As another example, if the NACK rate is above a threshold level, the token cost for transmission may be increased. As another example, the maximum number of tokens may decrease when the NACK rate is above a threshold level. Any combination of the token arrival rate/accumulation rate, transmission cost, transmission threshold, maximum number of accumulated tokens, as well as additional parameters, may be adjusted based on a determined a NACK rate. FIG. 6 illustrates an example 650 showing a change from a first token arrival rate/accumulation rate, transmission cost, transmission threshold, and/or maximum number of accumulated tokens being applied by a device when a first NACK rate is determined during the period 608. A second token arrival rate/accumulation rate, transmission cost, transmission threshold, and/or maximum number of accumulated tokens is applied by the device when a second NACK rate is determined at the period 610. For example, the second NACK rate may correspond to a NACK rate above a threshold amount, and the adjustment may correspond to a decreased token arrival rate/accumulation rate, an increased transmission cost, an increased transmission threshold, an/or a decreased maximum for the accumulated tokens. The higher NACK rate indicates that there may be a number of other devices attempting to transmit, and the adjustment(s) may reduce the likelihood that the device will be able to transmit a transmission. If each of the devices apply a similar adjustment, it may help to avoid overlapping transmissions. The device may return to using the first token arrival rate/accumulation rate, transmission cost, transmission threshold, and/or maximum number of accumulated tokens during period 612, e.g., if the NACK rate returns to a level below the threshold amount.

For example, an accumulation rate, token arrival, a maximum accumulation value, or token cost may be based, at least in part, on a beam used for the sidelink communication. For example, a different accumulation rate may be applied when using a first beam compared to using a second beam. A different token arrival parameter or accumulation rate may be applied when using a first beam than when using a second beam. A different maximum accumulation value may be used for communication using a first beam compared to a second beam for the communication. In an example, switching to a newly identified beam may cause the device to accumulate additional tokens. The newly identified beam may be a better beam for the device to use, e.g., having a better measured or reported reference signal received power (RSRP) and/or signal to interference and noise ratio (SINR). The beam may comprise a transmission beam and/or a reception beam.

Thus, the frequency with which devices may transmit communication, e.g., using sidelink, may be based, at least in part, on token accumulation rates, token costs, maximum accumulation values, etc. The frequency of priority transmissions may be limited, e.g., by having higher transmission costs for high priority transmissions and/or by having a reduced accumulation rate. As well, the accumulation parameters may be adjusted based on any of CBR, CR, ACK/NACK rates, and/or beam selection. Thus, the accumulation parameters may be adjusted to address current conditions, e.g., as indicated by CBR. The accumulation parameters may adjust to address a UE's current use of resources, e.g., as indicated by CR. The accumulation parameters may adjust to address success/failures of prior transmissions, e.g., as indicated by as indicated by ACK/NACK rates.

A base station may provide signaling that controls, at least in part, the accumulation parameters applied by devices communicating based on sidelink. For example, a base station may send an indication to a UE to increase/decrease a token cost for transmission, to increase/decrease a token arrival rate/accumulation rate, increase/decrease a maximum accumulation value, etc. The base station may send the indication in response to detecting interference that sidelink communication causes to access links with the base station. The base station may indicate the accumulation parameter adjustment to an individual UE or may indicate the adjustment to multiple devices communicating based on sidelink. Thus, if the base station detects interference above a threshold amount, the base station may throttle sidelink communication by providing the indication to the sidelink devices to adjust the accumulation parameters. The adjustment in the accumulation parameters will affect the frequency of sidelink transmissions and may reduce the interference to the access links. The base station may communicate, e.g., with the sidelink devices that are in coverage of the base station and/or that have a connection to the base station.

Figure 7:
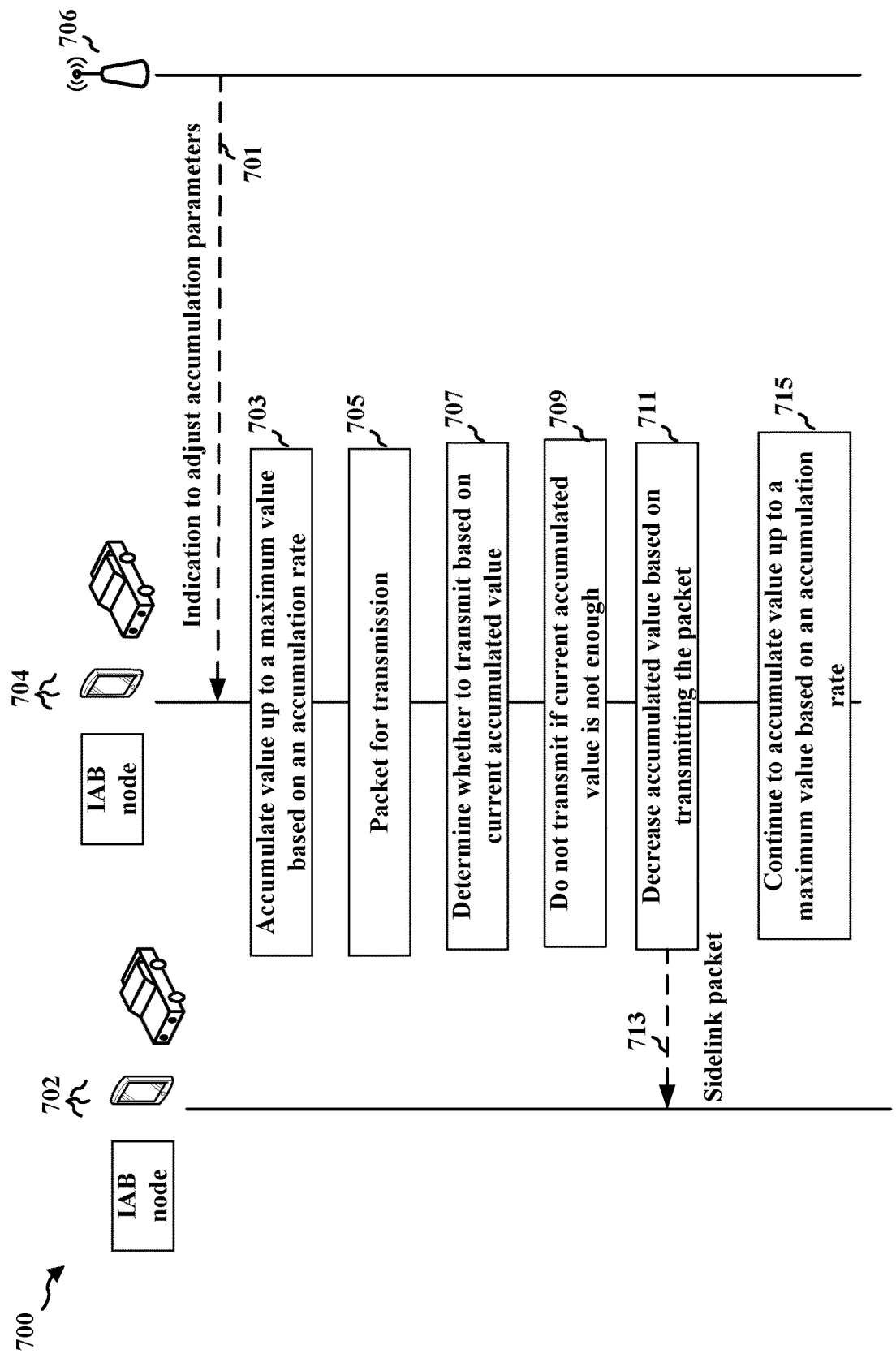
FIG. 7 illustrates an example communication flow between devices.

FIG. 7 illustrates an example communication flow 700 that may be based on the accumulation of a value and use of the value to determine whether to transmit communication. The communication may comprise, e.g., sidelink communication between device 704 and device 702. The devices 702 and 704 may be referred to herein as sidelink devices. As illustrated, the devices 702 or 704 may comprise a UE, and IAB node, a vehicle, or other device that exchanges communication based on sidelink. At 703, device 704 may maintain an accumulated value, e.g., as described in connection with any of FIGS. 4-6. The device 704 may apply accumulation parameters based at least in part on information 701 received from a base station 706. Alternatively or additionally, the accumulation may be based on parameters that are agreed upon within a network, e.g., based on a negotiation or agreement with other sidelink devices. At 705, device 704 may have a packet for transmission, e.g., for sidelink transmission. At 707, device 704 may determine whether to transmit the packet based, at least in part, on the current accumulated value. If the accumulated value is at least equal to the cost of transmission, the device 704 may transmit the packet 713 to device 702, and may decrease the accumulated value based on the cost of transmission, at 711. If the accumulated value is less than the cost of transmission, the device 704 may determine not to transmit the packet, at 709, and may wait to transmit later or may discard the packet. Then, at 715, the device 704 may continue to accumulate the value, e.g., increasing the value according to the accumulation rate up to a maximum accumulation value.

Figure 8:
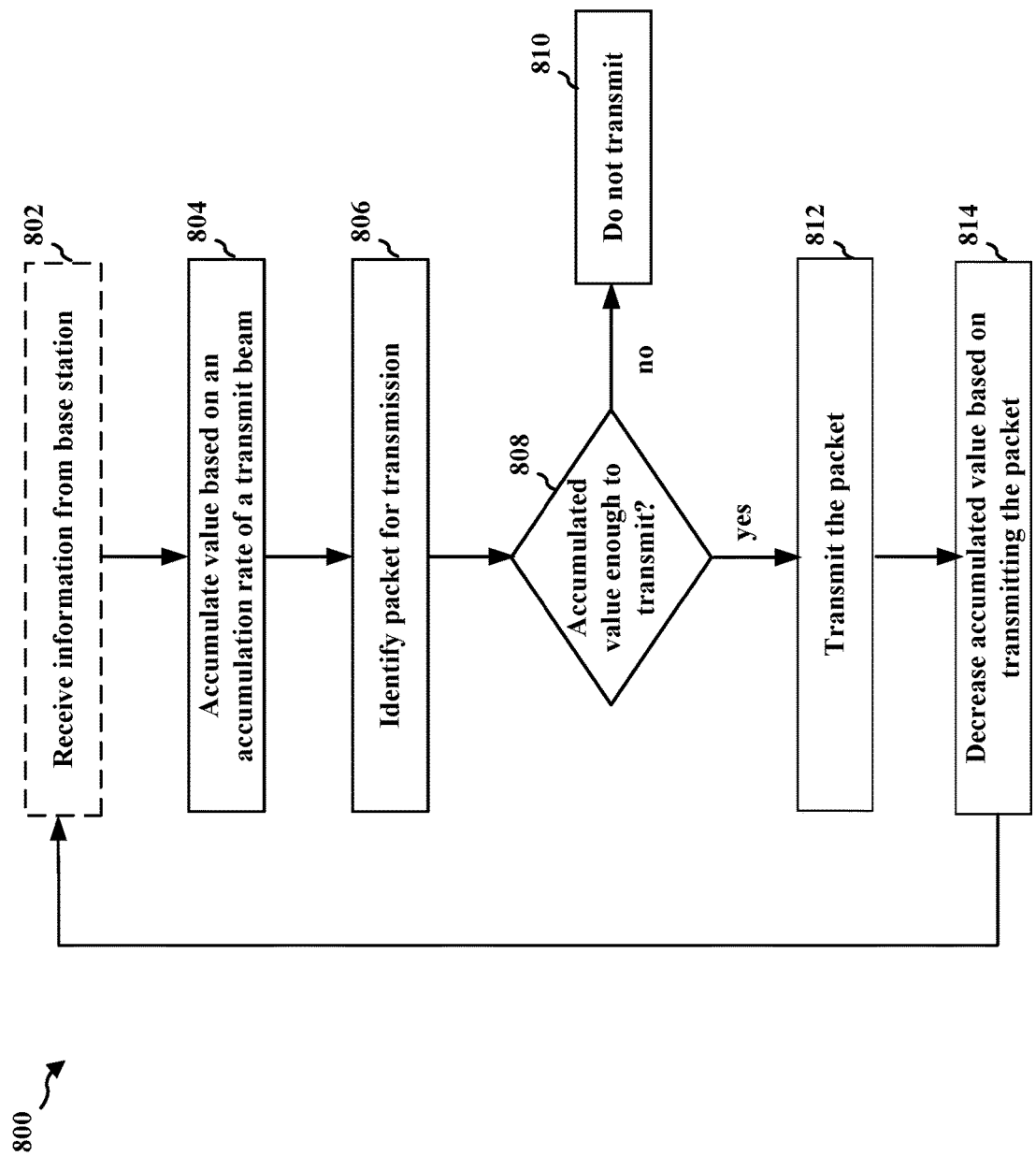
FIG. 8 is a flowchart of a method of wireless communication.

FIG. 8 is a flowchart 800 of a method of wireless communication. The method may be performed by a sidelink device. The sidelink device may comprise a UE or a component of a UE, an IAB node or a component of an IAB node, or another device that communicates based on sidelink (e.g., UE 104, IAB node 103, device 310, 350, 704; the apparatus 902, which may include memory and which may be an entire UE or a component of a UE). Optional aspects are illustrated with a dashed line. The method may help to adjust communication, such as sidelink communication, to address any of current conditions, a device's use of resources, success/failure of communication, etc.

At 804, the device accumulates a value based on an accumulation rate of a transmit beam. The value may be accumulated in common for transmissions of the first priority level and transmissions of the second priority level, e.g., as described in connection with example 450. The device may accumulate a first value, e.g., high priority value, associated with a first priority level and may accumulate a second value, e.g., a low priority value, associated with a second priority level, e.g., as described in connection with example 400 in FIG. 4. The high priority value may be accumulated at a lower accumulation rate than the low priority value. The high priority value and the low priority value may be accumulated up to a maximum value. For example, a first maximum value associated with the high priority value may be lower than a second maximum value associated with the low priority value. The accumulation may be performed, e.g., by accumulation component 940 of apparatus 902. As described in connection with FIG. 6, an accumulation rate, token arrival, a maximum accumulation value, or token cost may be based, at least in part, on a beam used for the sidelink communication.

The value may be accumulated up to a maximum value based at least in part on a CBR determined by the transmitting device. For example, at least one of the accumulation rate of the transmit beam or the maximum value may be based on the channel busy ratio. The device may use an increased accumulation rate for the transmit beam or an increased maximum value when the channel busy ratio is below a threshold, e.g., as described in connection with example 500 of FIG. 5.

The value may be accumulated up to a maximum value based at least in part on a CR determined by the transmitting device. For example, the accumulation rate of the transmit beam and/or the maximum value may be based on the channel occupancy ratio. The device may use an increased accumulation rate for the transmit beam or an increased maximum value when the channel occupancy ratio is below a threshold, e.g., as described in connection with example 550 of FIG. 5.

The value may be accumulated up to a maximum value based at least in part on a feedback received by the transmitting device. For example, the accumulation rate of the transmit beam and/or the maximum value are based on the feedback received by the transmitting device. As an example, the value may be accumulated based at least in part on a positive feedback rate for the transmitting device, and the transmitting device may use an increased accumulation rate, at 804, or an increased maximum value when the positive feedback rate is above a threshold, e.g., as described in connection with example 600 of FIG. 6. As another example, the value may be accumulated based at least in part on a negative feedback rate for the transmitting device. For example, the transmitting device may use a decreased accumulation rate for the transmit beam or a decreased maximum value when the negative feedback rate is above a threshold, e.g., as described in connection with example 650 of FIG. 7.

As illustrated at 802, the device may receive information from a base station that may affect an accumulation parameter. Thus, the accumulation parameters, e.g., at least one of the accumulation rate of a transmit beam or a maximum accumulation value, applied at 804 may be based on the information received from the base station. The reception may be performed, e.g., by reception component 930 of apparatus 902.

At 806, the device identifies a packet for transmission over a sidelink. The packet may be identified, e.g., by packet component 942 of apparatus 902.

At 808, the device determines whether to transmit the packet over the sidelink based on a current accumulation of the value. As described in connection with the examples in FIGS. 4 and 707 in FIG. 7, the device may compare a transmission cost or a transmission threshold amount to the current accumulated value. The determination may be performed, e.g., by determination component 944 of apparatus 902.

At 810, the device may refrain from transmitting the packet over the sidelink when the current accumulation of the value is less than the threshold. The device may wait to transmit the packet until the accumulated value is sufficient. Alternatively, the device may discard the packet.

At 812, the device may transmit the packet over the sidelink when the current accumulation of the value meets a threshold. The transmission may be performed, e.g., by transmission component 934 of apparatus 902.

At 814, the device decreases the accumulated value by an amount if the transmitting device transmits the packet, wherein the amount is the same for packets of the first priority level and the second priority level. For example, as described in connection with examples 400 and 450 in FIG. 4, the device may reduce the accumulated value based on a cost of transmission. As described in connection with example 450, the device may reduce a common value by a first amount if the packet corresponds to a first priority level and may reduce the value by a second amount if the packet corresponds to a second priority level. As described in connection with example 400, the device may reduce the value by an amount if the transmitting device transmits the packet, wherein the amount is the same for packets of the first priority level and the second priority level. The decrease may be applied, e.g., by accumulation component 940 of apparatus 902.

Figure 9:
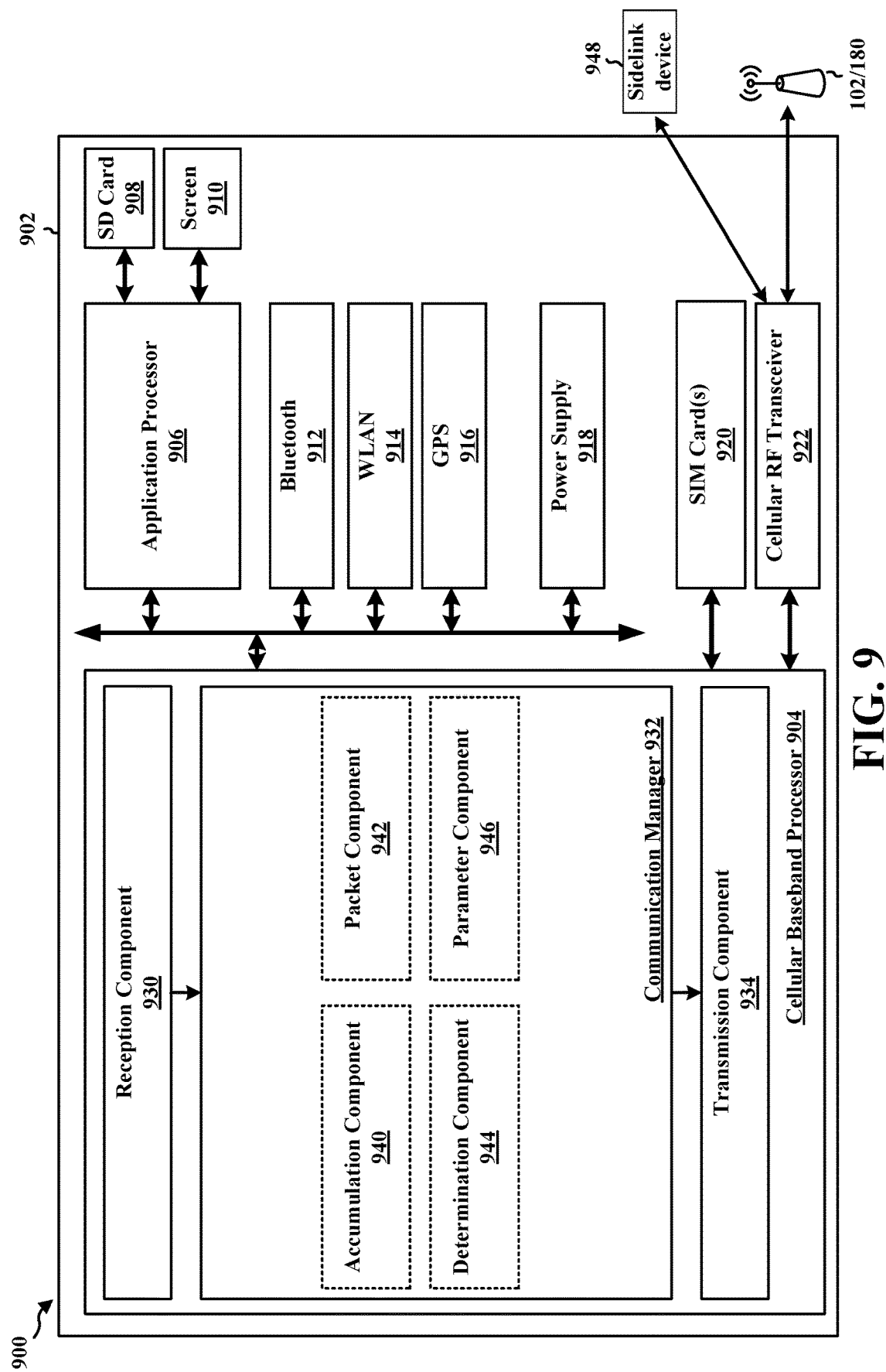
FIG. 9 is a diagram illustrating an example of a hardware implementation for an example apparatus.

FIG. 9 is a diagram 900 illustrating an example of a hardware implementation for an apparatus 902. The apparatus 902 is a sidelink device and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The sidelink device may be a UE, such as UE 104, an IAB node, such as the IAB node 103, or another device that communicates based on sidelink. The cellular baseband processor 904 communicates through the cellular RF transceiver 922 with the sidelink device 948 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the device 310 or 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire device (e.g., see 350 of FIG. 3) and include the described additional modules of the apparatus 902.

The communication manager 932 includes an accumulation component 940, packet component 942, determination component 944, and parameter component 946 that may be configured to perform the aspects described in connection with FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902 for wireless communication includes means for accumulating a value based on an accumulation rate for a transmit beam, means for identifying a packet for transmission over a sidelink, and means for determining whether to transmit the packet over the sidelink based on a current accumulation of the value. The apparatus 902 may include means for transmitting the packet over the sidelink when the current accumulation of the value meets a threshold. The apparatus 902 may include means for refraining from transmitting the packet over the sidelink when the current accumulation of the value is less than the threshold. The apparatus 902 may include means for receiving information from a base station, wherein at least one of the accumulation rate of the transmit beam or a maximum accumulation value is based on the information received from the base station. The aforementioned means may be one or more of the aforementioned components of the apparatus 902 configured to perform the functions recited by the aforementioned means. As described supra, the apparatus 902 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 10:
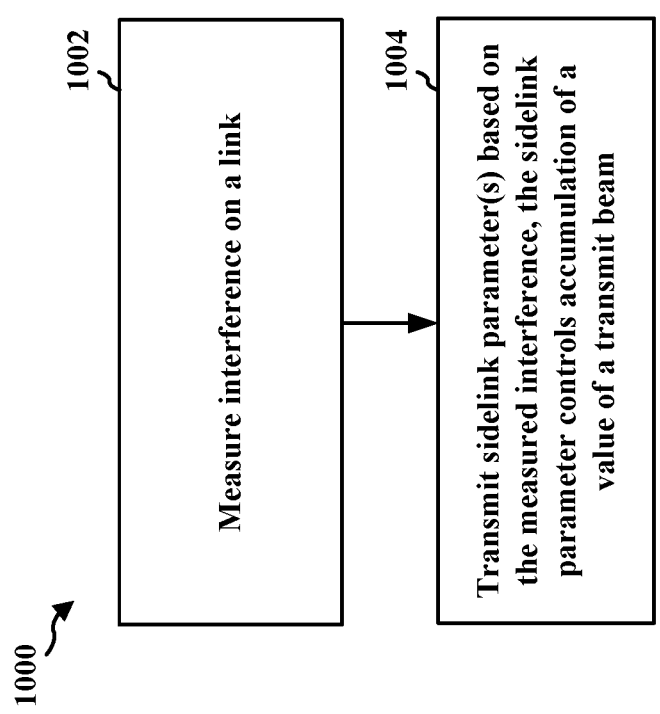
FIG. 10 is a flowchart of a method of wireless communication.

FIG. 10 is a flowchart 1000 of a method of wireless communication. The method may be performed by a base station or a component of a base station (e.g., base station 102, 180, 706, the apparatus 1102, which may include memory and which may comprise any of the TX processor 316, the RX processor 370, and the controller/processor 375).

At 1002, the base station measures interference on a link of the apparatus, e.g., that may be caused by sidelink communication of other devices. As an example, the base station may measure interference on a link of a receive or transmit beam of the base station. Thus, the interference may be based on the sidelink communication. The interference may be measured, e.g., by interference component 1140 of apparatus 1102. For example, if the base station detects interference above a threshold level, the base station may determine to throttle sidelink communication in order to improve the interference experienced by access links with the base station.

At 1004, the base station transmits a sidelink parameter that controls accumulation of a value of a transmit beam at a transmitting device for the transmission of sidelink communication. The sidelink parameter may be indicated, e.g., by sidelink parameter component 1144 of apparatus 1102. The sidelink parameter may increase at least one of an accumulation rate for the transmit beam or a maximum accumulation value when the interference is below a threshold. The sidelink parameter may decrease at least one of an accumulation rate for the transmit beam or a maximum accumulation value when the interference is above a threshold.

Figure 11:
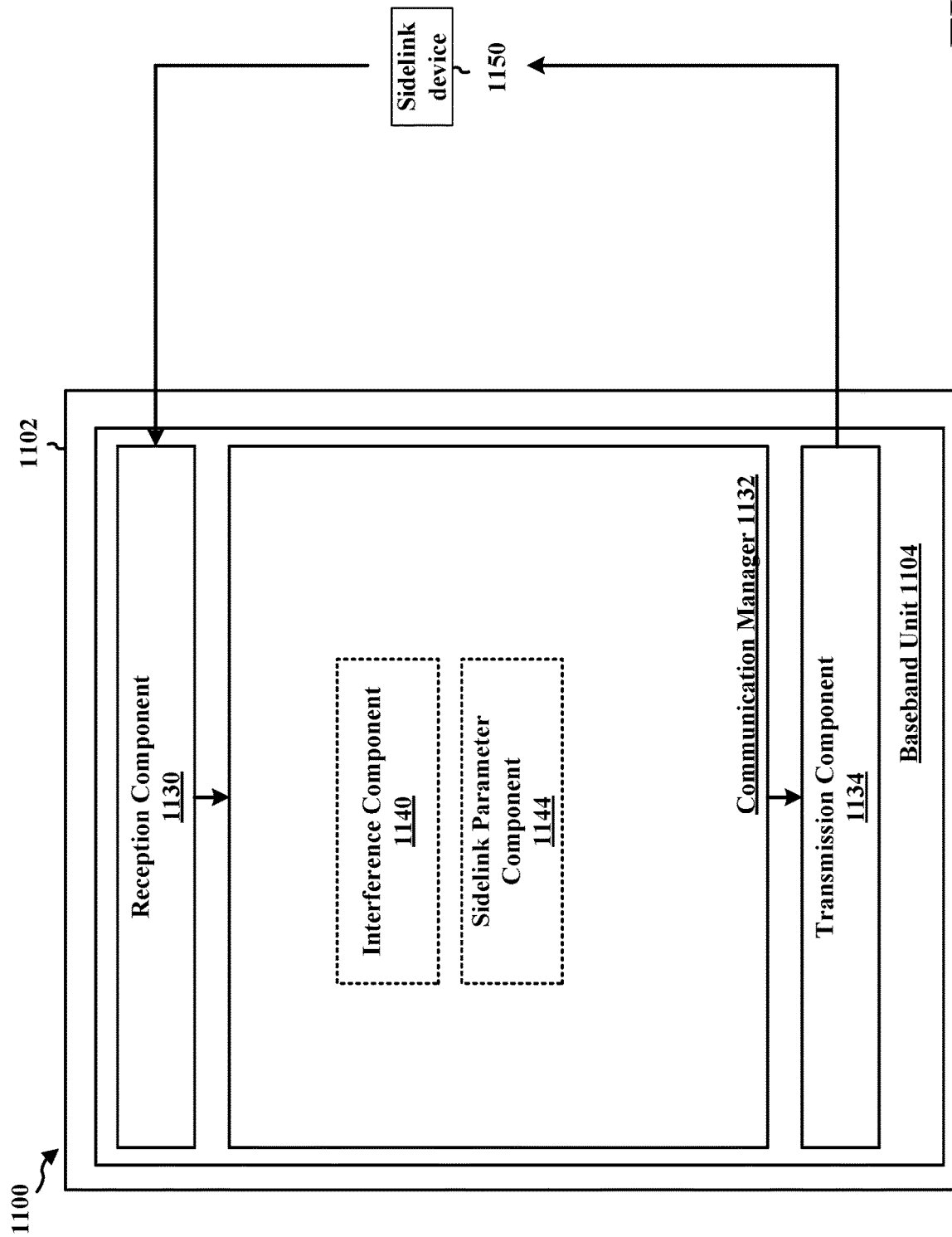
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the sidelink device 1150. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the device 310 and may include the memory 376 and/or at least one of the TX processor 316, the RX processor 370, and the controller/processor 375.

The communication manager 1132 includes an interference component 1140 and a sidelink parameter component 1144 that are configured to perform the aspects described in connection with FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102 for wireless communication includes means for measuring interference on a link of the base station and means for transmitting a sidelink parameter, wherein the sidelink parameter controls accumulation of a value of a transmit beam at a transmitting device for the transmission of sidelink communication. The aforementioned means may be one or more of the aforementioned components of the apparatus 1102 configured to perform the functions recited by the aforementioned means. described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a sidelink device, comprising: accumulating a value based on an accumulation rate of a transmit beam; identifying a packet for transmission over a sidelink; and determining whether to transmit the packet over the sidelink based on a current accumulation of the value.

In Example 2, the method of Example 1 further includes transmitting the packet over the sidelink on the transmit beam when the current accumulation of the value meets a threshold for the transmit beam; and refraining from transmitting the packet over the sidelink when the current accumulation of the value is less than the threshold for the transmit beam.

In Example 3, the method of Example 1 or Example 2 further includes that the value is accumulated up to a maximum value based at least in part on a channel busy ratio determined by the sidelink device.

In Example 4, the method of any of Examples 1-3 further includes that at least one of the accumulation rate of the transmit beam or the maximum value are based on the channel busy ratio, and wherein the sidelink device uses an increased accumulation rate for the transmit beam or an increased maximum value when the channel busy ratio is below a threshold.

In Example 5, the method of any of Examples 1-4 further includes that the value is accumulated up to a maximum value based at least in part on a channel occupancy ratio determined by the sidelink device.

In Example 6, the method of any of Examples 1-5 further includes that at least one of the accumulation rate of the transmit beam or the maximum value are based on the channel occupancy ratio, and wherein the sidelink device uses an increased accumulation rate for the transmit beam or an increased maximum value when the channel occupancy ratio is below a threshold.

In Example 7, the method of any of Examples 1-6 further includes that the value is accumulated up to a maximum value based at least in part on a feedback received by the sidelink device.

In Example 8, the method of any of Examples 1-7 further includes that at least one of the accumulation rate of the transmit beam or the maximum value are based on the feedback received by the sidelink device.

In Example 9, the method of any of Examples 1-8 further includes that the value is accumulated based at least in part on a positive feedback rate for the sidelink device, and the sidelink device uses an increased accumulation rate for the transmit beam or an increased maximum value when the positive feedback rate is above a threshold.

In Example 10, the method of any of Examples 1-9 further includes that the value is accumulated based at least in part on a negative feedback rate for the sidelink device, and the sidelink device uses a decreased accumulation rate for the transmit beam or a decreased maximum value when the negative feedback rate is above a threshold.

In Example 11, the method of any of Examples 1-10 further includes receiving information from a base station, wherein at least one of the accumulation rate of the transmit beam or a maximum accumulation value is based on the information received from the base station.

In Example 12, the method of any of Examples 1-11 further includes that the sidelink device accumulates a high priority value associated with a first priority level and accumulates a low priority value associated with a second priority level, wherein the first priority level has a higher priority than the second priority level.

In Example 13, the method of any of Examples 1-12 further includes that reducing the value by an amount if the sidelink device transmits the packet, wherein the amount is the same for packets of the first priority level and the second priority level.

In Example 14, the method of any of Examples 1-13 further includes that the high priority value is accumulated at a lower accumulation rate than the low priority value.

In Example 15, the method of any of Examples 1-14 further includes that the high priority value and the low priority value are accumulated up to a maximum value, and wherein a first maximum value associated with the high priority value is lower than a second maximum value associated with the low priority value.

In Example 16, the method of any of Examples 1-15 further includes that if the sidelink device transmits the packet on the transmit beam, the method further comprises: reducing the value by a first amount if the packet corresponds to a first priority level; and reducing the value by a second amount if the packet corresponds to a second priority level.

In Example 17, the method of any of Examples 1-16 further includes that the value is accumulated in common for transmissions of the first priority level and transmissions of the second priority level.

Example 18 is a device including one or more processors and one or more memories in electronic communication with the one or more processors storing instructions executable by the one or more processors to cause the device to implement a method as in any of Examples 1-17.

Example 19 is a system or apparatus including means for implementing a method or realizing an apparatus as in any of Examples 1-17.

Example 20 is a non-transitory computer readable medium storing instructions executable by one or more processors to cause the one or more processors to implement a method as in any of Examples 1-17.

Example 21 is a method of wireless communication at a base station, comprising: measuring interference on a link of the base station; and transmitting a sidelink parameter based on the measured interference, wherein the sidelink parameter controls accumulation of a value of a transmit beam at a sidelink device for transmission of sidelink communication.

In Example 22, the method of Example 21 further includes that the interference is based on the sidelink communication.

In Example 23, the method of Example 21 or Example 22 further includes that the sidelink parameter increases at least one of an accumulation rate for the transmit beam or a maximum accumulation value when the interference is below a threshold.

In Example 24, the method of any of Examples 21-23 further includes that the sidelink parameter decreases at least one of an accumulation rate for the transmit beam or a maximum accumulation value when the interference is above a threshold.

Example 25 is a device including one or more processors and one or more memories in electronic communication with the one or more processors storing instructions executable by the one or more processors to cause the device to implement a method as in any of Examples 21-24.

Example 26 is a system or apparatus including means for implementing a method or realizing an apparatus as in any of Examples 21-24.

Example 27 is a non-transitory computer readable medium storing instructions executable by one or more processors to cause the one or more processors to implement a method as in any of Examples 21-24.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:
   accumulating a count value over time based on an accumulation rate associated with a transmit beam;
   identifying a packet for transmission over a sidelink on the transmit beam;
   determining whether to transmit the packet over the sidelink on the transmit beam based on the count value associated with the transmit beam; and
   reducing the count value associated with the transmit beam if the wireless device transmits the packet over the sidelink on the transmit beam, a reduction of the count value associated with the transmit beam being based on a priority level associated with the packet.

2. The method of claim 1, further comprising:
   transmitting the packet over the sidelink on the transmit beam when the count value meets a threshold for the transmit beam; and
   refraining from transmitting the packet over the sidelink when the count value is less than the threshold for the transmit beam.

3. The method of claim 1, wherein the count value is accumulated up to a maximum value based at least in part on a channel busy ratio determined by the wireless device.

4. The method of claim 3, wherein at least one of the accumulation rate of the transmit beam or the maximum value are based on the channel busy ratio, and wherein the wireless device uses an increased accumulation rate for the transmit beam or an increased maximum value when the channel busy ratio is below a threshold.

5. The method of claim 1, wherein the count value is accumulated up to a maximum value based at least in part on a channel occupancy ratio determined by the wireless device.

6. The method of claim 5, wherein at least one of the accumulation rate of the transmit beam or the maximum value are based on the channel occupancy ratio, and wherein the wireless device uses an increased accumulation rate for the transmit beam or an increased maximum value when the channel occupancy ratio is below a threshold.

7. The method of claim 1, wherein the count value is accumulated up to a maximum value based at least in part on a feedback received by the wireless device.

8. The method of claim 7, wherein at least one of the accumulation rate of the transmit beam or the maximum value are based on the feedback received by the wireless device.

9. The method of claim 8, wherein the count value is accumulated based at least in part on a positive feedback rate for the wireless device, and the wireless device uses an increased accumulation rate for the transmit beam or an increased maximum value when the positive feedback rate is above a threshold.

10. The method of claim 8, wherein the count value is accumulated based at least in part on a negative feedback rate for the wireless device, and the wireless device uses a decreased accumulation rate for the transmit beam or a decreased maximum value when the negative feedback rate is above a threshold.

11. The method of claim 1, further comprising:
receiving information from a base station, wherein at least one of the accumulation rate of the transmit beam or a maximum accumulation value is based on the information received from the base station.

12. The method of claim 1, wherein the wireless device accumulates a high priority value associated with a first priority level and accumulates a low priority value associated with a second priority level, wherein the first priority level has a higher priority than the second priority level.

13. The method of claim 12, further comprising:
reducing the count value by an amount if the wireless device transmits the packet, wherein the amount is the same for packets of the first priority level and the second priority level.

14. The method of claim 12, wherein the high priority value is accumulated at a lower accumulation rate than the low priority value.

15. The method of claim 12, wherein the high priority value and the low priority value are accumulated up to a maximum value, and wherein a first maximum value associated with the high priority value is lower than a second maximum value associated with the low priority value.

16. The method of claim 1, wherein if the wireless device transmits the packet on the transmit beam, the method further comprises:
reducing the count value by a first amount if the packet corresponds to a first priority level; and
reducing the count value by a second amount if the packet corresponds to a second priority level.

17. The method of claim 16, wherein the count value is accumulated in common for transmissions of the first priority level and transmissions of the second priority level.

18. A method of wireless communication at a base station, comprising:
measuring interference on a link of the base station; and
transmitting, based on the measured interference, a sidelink parameter that controls, in connection with a priority level of a sidelink transmission, accumulation of a count value associated with a transmit beam at a wireless device for transmission of sidelink communication.

19. The method of claim 18, wherein the interference is based on the sidelink communication.

20. The method of claim 18, wherein the sidelink parameter increases at least one of an accumulation rate for the transmit beam or a maximum accumulation value when the interference is below a threshold.

21. The method of claim 18, wherein the sidelink parameter decreases at least one of an accumulation rate for the transmit beam or a maximum accumulation value when the interference is above a threshold.

22. An apparatus for wireless communication at a wireless device, comprising:
a memory; and
at least one processor coupled to the memory and configured to:
accumulate a count value based on an accumulation rate associated with a transmit beam;
identify a packet for transmission over a sidelink on the transmit beam;
determine whether to transmit the packet over the sidelink on the transmit beam based on the count value associated with the transmit beam; and
reduce the count value associated with the transmit beam if the wireless device transmits the packet on the transmit beam, a reduction of the count value associated with the transmit beam being based on a priority level associated with the packet.

23. The apparatus of claim 22, wherein the at least one processor is further configured to:
transmit the packet over the sidelink on the transmit beam when the count value meets a threshold of the transmit beam; and
refrain from transmitting the packet over the sidelink when the count value is less than the threshold of the transmit beam.

24. The apparatus of claim 22, wherein the count value is accumulated up to a maximum value based at least in part on a channel busy ratio determined by the wireless device, and wherein the wireless device uses an increased accumulation rate for the transmit beam or an increased maximum value when the channel busy ratio is below a threshold.

25. The apparatus of claim 22, wherein the count value is accumulated up to a maximum value based at least in part on a channel occupancy ratio determined by the wireless device, wherein the wireless device uses an increased accumulation rate for the transmit beam or an increased maximum value when the channel occupancy ratio is below a threshold.

26. The apparatus of claim 22, wherein the count value is accumulated up to a maximum value based at least in part on a feedback received by the wireless device.

27. The apparatus of claim 22, wherein the at least one processor is further configured to:
receive information from a base station, wherein at least one of the accumulation rate of the transmit beam or a maximum accumulation value is based on the information received from the base station.

28. The apparatus of claim 22, wherein the wireless device accumulates a high priority value associated with a first priority level and accumulates a low priority value associated with a second priority level, wherein the first priority level has a higher priority than the second priority level, wherein the at least one processor is further configured to:
reduce the count value by an amount if the wireless device transmits the packet, wherein the amount is the same for packets of the first priority level and the second priority level.

29. The apparatus of claim 22, wherein if the wireless device transmits the packet, the at least one processor is further configured to:
- reduce the count value by a first amount if the packet corresponds to a first priority level; and
- reduce the count value by a second amount if the packet corresponds to a second priority level.

30. An apparatus for wireless communication at a base station, comprising:
- a memory; and
- at least one processor coupled to the memory and configured to:
  - measure interference on a link of the base station; and
  - transmit, based on the measured interference, a sidelink parameter that controls, in connection with a priority level of a sidelink transmission, accumulation of a count value associated with a transmit beam at a wireless device for transmission of sidelink communication.

* * * * *